US009807241B2

(12) United States Patent
Liu et al.

(10) Patent No.: US 9,807,241 B2
(45) Date of Patent: Oct. 31, 2017

(54) ELECTRONIC DEVICE AND METHOD FOR MANAGING INCOMING CALLS

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Fang-Hua Liu, Shenzhen (CN); Zhe Yang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/367,454

(22) Filed: Dec. 2, 2016

(65) Prior Publication Data

US 2017/0195489 A1 Jul. 6, 2017

(30) Foreign Application Priority Data

Dec. 30, 2015 (CN) .......................... 2015 1 1018564

(51) Int. Cl.

*H04M 1/64* (2006.01)
*H04M 3/527* (2006.01)
*H04M 3/436* (2006.01)
*H04M 1/02* (2006.01)
*H04M 3/54* (2006.01)

(52) U.S. Cl.

CPC ......... *H04M 3/527* (2013.01); *H04M 1/0264* (2013.01); *H04M 3/4365* (2013.01); *H04M 3/54* (2013.01)

(58) Field of Classification Search

CPC ... H04M 3/527; H04M 1/0264; H04M 3/4365
See application file for complete search history.

(56) References Cited

U.S. PATENT DOCUMENTS

2011/0040757 A1* 2/2011 Kossi .................. G06F 17/3002 707/737
2015/0094047 A1* 4/2015 Jung ....................... H04W 4/16 455/415
2016/0191864 A1* 6/2016 Siminoff ................ H04N 7/186 348/155
2017/0053284 A1* 2/2017 Votaw ................ G06Q 20/1085

* cited by examiner

*Primary Examiner* — Simon King
(74) *Attorney, Agent, or Firm* — Steven Reiss

(57) ABSTRACT

A method for managing an incoming call includes sending a first predetermined voice message to a caller when a fixed-line telephone receives the incoming call from the caller, capturing an image of a predetermined scene range of the fixed-line telephone when the incoming call is determined to be calling for the owner of the fixed-line telephone, sending prompt information to at least one mobile device when the owner of the fixed-line telephone is not detected, performing a corresponding function according to a selected operation of an owner of the at least one mobile device.

18 Claims, 2 Drawing Sheets

Electronic device 1
Processor 13
Controlling system 10
Detection module 21
Inquiring module 22
Acquiring module 23
Recognizing module 24
Sending module 25
Controlling module 26
Image acquisition device 11
Storage device 12
Fixed-line telephone 2
Mobile device 3

ELECTRONIC DEVICE AND METHOD FOR MANAGING INCOMING CALLS

CROSS-REFERENCE TO RELATED APPLICATIONS

This application claims priority to Chinese Patent Application No. 201511018564.9 filed on Dec. 30, 2015, the contents of which are incorporated by reference herein.

FIELD

The subject matter herein generally relates to telecommunications technology, and particularly to an electronic device and a method for managing incoming calls.

BACKGROUND

Landline telephones are widely used at the office. However, people who works around the landline telephone but is not an owner of the landline telephone may be disturbed by continuous ring of an incoming call of the Landline telephone when the incoming call is not answered for some reasons such as an owner of the landline telephone is not at the office.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
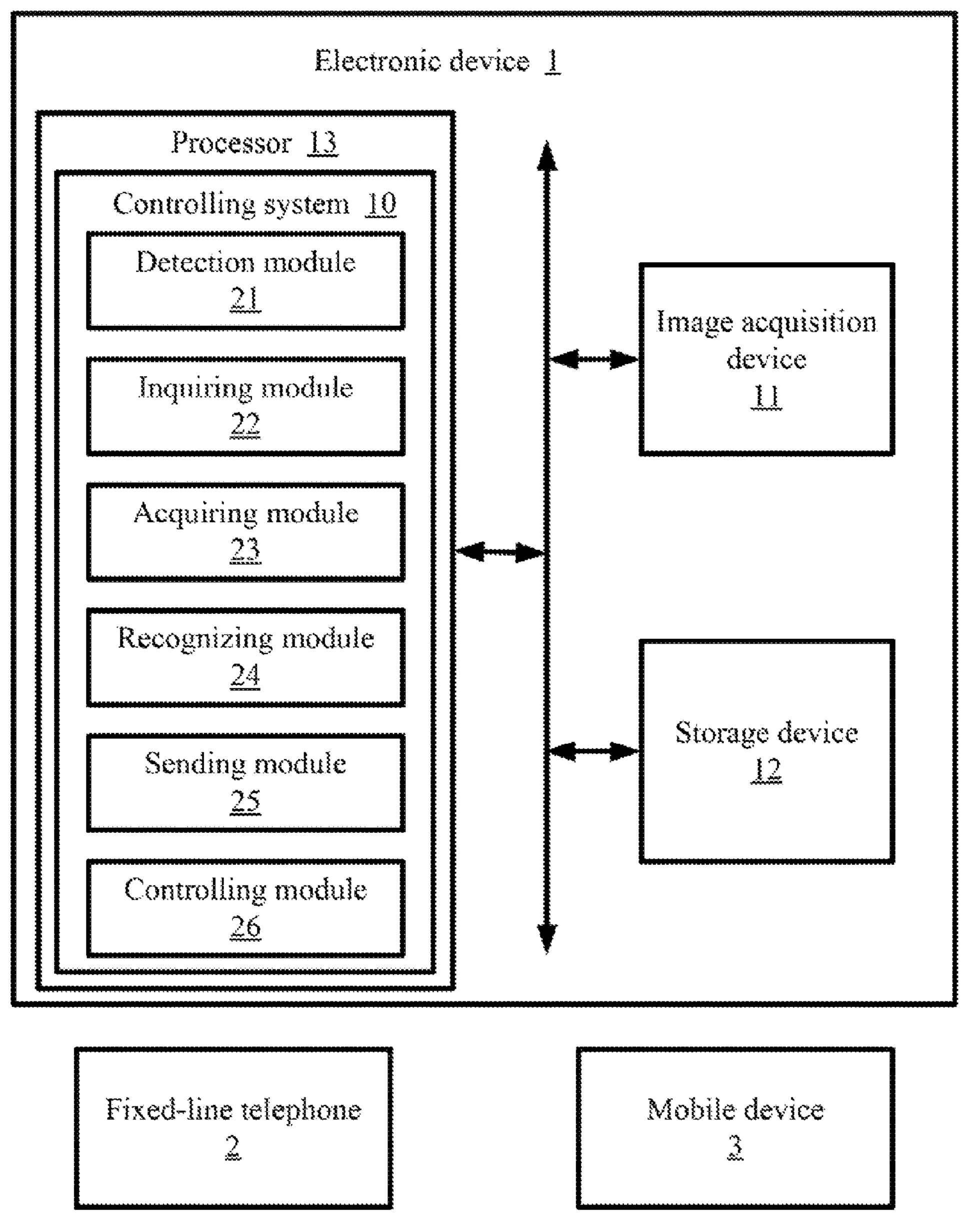
FIG. 1 shows one exemplary embodiment of an electronic device including a controlling system.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to “an” or “one” exemplary embodiment in this disclosure are not necessarily to the same exemplary embodiment, and such references mean “at least one.”

Furthermore, the term “module”, as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 shows one exemplary embodiment of an electronic device 1 including a controlling system 10. Depending on the exemplary embodiment, the electronic device 1 can include, but is not limited to, an image acquisition device 11, a storage device 12, and at least one processor 13. The above components communicate with each other through a system bus. FIG. 1 illustrates only one example of the electronic device 1 that can include more or fewer components than illustrated, or have a different configuration of the various components in other exemplary embodiments.

In at least one exemplary embodiment, the electronic device 1 can establish communication connections with a fixed or landline telephone (hereinafter referred to as fixed-line telephone 2) and at least one mobile device 3. In at least one exemplary embodiment, an owner of the mobile device 3 can be same as an owner of the fixed-line telephone 2.

In at least one exemplary embodiment, the image acquisition device 11 can include at least one camera (not shown in FIG. 1), the image acquisition device 11 can capture an image of the owner of the fixed-line telephone 2. The captured image can be a facial image of the owner of the fixed-line telephone 2. In at least one exemplary embodiment, the image acquisition device 11 can be internally installed in the electronic device 1. In other exemplary embodiments, the image acquisition device 11 can be externally connected to the electronic device 1.

The storage device 12 can be an internal storage device, such as a flash memory, a random access memory (RAM) for temporary storage of information, and/or a read-only memory (ROM) for permanent storage of information. The storage device 12 can also be an external storage device, such as an external hard disk, a storage card, or a data storage medium.

The at least one processor 13 can be a central processing unit (CPU), a microprocessor, or other data processor chip that performs functions of the electronic device 1.

In at least one exemplary embodiment, the controlling system 10 can transfer an incoming call from the fixed-line telephone 2 to the mobile device 3 when the owner of the fixed-line telephone 2 cannot be detected. In at least one exemplary embodiment, the controlling system 10 can filter out an incoming call when the incoming call is determined to be not calling for the owner of the fixed-line telephone 2. In at least one exemplary embodiment, the controlling system 10 can automatically hang up an incoming call when the owner of the fixed-line telephone 2 is determined to be not available to answer the incoming call.

In at least one exemplary embodiment, the controlling system 10 can include a detection module 21, an inquiring module 22, an acquiring module 23, a recognizing module 24, a sending module 25, and a controlling module 26. The modules 21-26 include computerized codes in the form of one or more programs that may be stored in the storage device 12. The computerized codes include instructions that are executed by the at least one processor 13.

In at least one exemplary embodiment, the detection module 21 can detect whether the fixed-line telephone 2 receives an incoming call from a caller.

In at least one exemplary embodiment, the inquiring module 22 can respond to the incoming call and determine whether the incoming call is calling for the owner of the fixed-line telephone 2 by at least following steps. The inquiring module 22 outputs a first predetermined voice message to the caller. In at least one exemplary embodiment, the storage device 12 can prestore a name of the owner of the fixed-line telephone 2. In at least one exemplary embodiment, the first predetermined voice message may be for example "please let me know who are you, and who do you want to call". The inquiring module 22 determines whether the caller is calling for the owner of the fixed-line telephone 2 according to an answer from the caller. For example, the inquiring module 22 outputs the first predetermined voice message to the caller, and receives the answer from the caller. The inquiring module 22 compares the answer to the stored name of the owner of the fixed-line telephone 2 to recognize whether the incoming call calls for the owner of the fixed-line telephone 2. When the name of the owner of the fixed-line telephone 2 is recognized from the answer of the caller, the inquiring module 22 determines that the caller is calling for the owner of the fixed-line telephone 2. When the name of the owner of the fixed-line telephone 2 is not recognized from the answer of the caller, the inquiring module 22 determines that the caller is not calling for the owner of the fixed-line telephone 2. In at least one exemplary embodiment, the inquiring module 22 can further recognize a name of the caller from the answer of the caller.

In at least one exemplary embodiment, when the inquiring module 22 determines that the caller is not calling for the owner of the fixed-line telephone 2, the inquiring module 22 further can output a second predetermined voice message to the caller and hang up the incoming call. The second predetermined voice message may be for example "Sorry, you have the wrong number.".

In at least one exemplary embodiment, the acquiring module 23 can activate the image acquisition device 11 to capture an image of a predetermined scene range of the fixed-line telephone 2. The acquiring module 23 further can send the captured image to the recognizing module 24. In at least one exemplary embodiment, the predetermined scene range of the fixed-line telephone 2 can be a semicircle whose center is the position where the owner of the fixed-line telephone 2 sits. The semicircle has a predetermined radius value such as 1 meter, 1.5 meters. In at least one exemplary embodiment, the fixed-line telephone 2 may be positioned near the position where the owner of the fixed-line telephone 2 sits.

In at least one exemplary embodiment, the recognizing module 24 can determine whether the captured image includes the owner of the fixed-line telephone 2. In at least one exemplary embodiment, when the captured image does not include a facial image, the recognizing module 24 determines that the captured image does not include the owner of the fixed-line telephone 2, and determines that the owner of the fixed-line telephone 2 is not detected. In at least one exemplary embodiment, when the captured image includes a facial image, the recognizing module 24 can preprocess the captured image such as making light compensation for the captured image, making grey level transformation for the captured image, making geometric correction for the captured image, filtering the captured image, and sharpening the captured image. The recognizing module 24 can extract geometry characteristics of the facial image.

In at least one exemplary embodiment, the geometry characteristics can be characteristics constituted by eyes, a nose, and a mouth of the facial image. The recognizing module 24 further can compare the extracted geometry characteristics with predetermined geometry characteristics that are prestored in the storage device 12. When the extracted geometry characteristics match the predetermined geometry characteristics, the recognizing module 24 can determine the owner of the fixed-line telephone 2 is detected. When the extracted geometry characteristics do not match the predetermined geometry characteristics, the recognizing module 24 can determine that the owner of the fixed-line telephone 2 is not detected.

In at least one exemplary embodiment, when the owner of the fixed-line telephone 2 is not detected, the sending module 25 can generate prompt information according to the incoming call from the caller, and send the prompt information to the mobile device 3.

In at least one exemplary embodiment, the sending module 25 can send the prompt information through a network. The network may be wireless networks, such as Global System for Mobile Communications (GSM), General Packet Radio Service (GPRS), Code Division Multiple Access (CDMA), Wideband CDMA (W-CDMA), Wireless Fidelity (Wi-Fi), Long-Term Evolution (LTE), LTE Advanced and so on. In at least one exemplary embodiment, the prompt information includes a name of the caller.

In at least one exemplary embodiment, the sending module 25 can send the prompt information to the mobile device 3 in a form of a text message. The mobile device 3 can display the text message on a display device thereof. The mobile device 3 can provide a first virtual button for answering the incoming call and a second virtual button for refusing the incoming call.

In other exemplary embodiments, the sending module 25 can send the prompt information to the mobile device 3 in a form of voice data, and the owner of the mobile device 3 can answer or refuse the incoming call through voices.

In at least one exemplary embodiment, the controlling module 26 can perform a corresponding function according to a selected operation that has been made by the owner of the mobile device 3.

For example, when the owner of the mobile device 3 selects the first virtual button, the mobile device 3 can send at least one answer signal to the electronic device 1. The controlling module 26 can respond to the answer signal by transferring the incoming call from the fixed-line telephone 2 to the mobile device 3. When the owner of the mobile device 3 selects the second virtual button, the mobile device 3 can send at least one reject signal to the electronic device 1. The controlling module 26 can respond to the reject signal by hanging up the incoming call, and send a third predetermined voice message to the caller. The third predetermined voice message may be "Sorry, YY is busy now. He/she is not available to answer your call". YY is the name of the owner of the fixed-line telephone 2.

Figure 2:
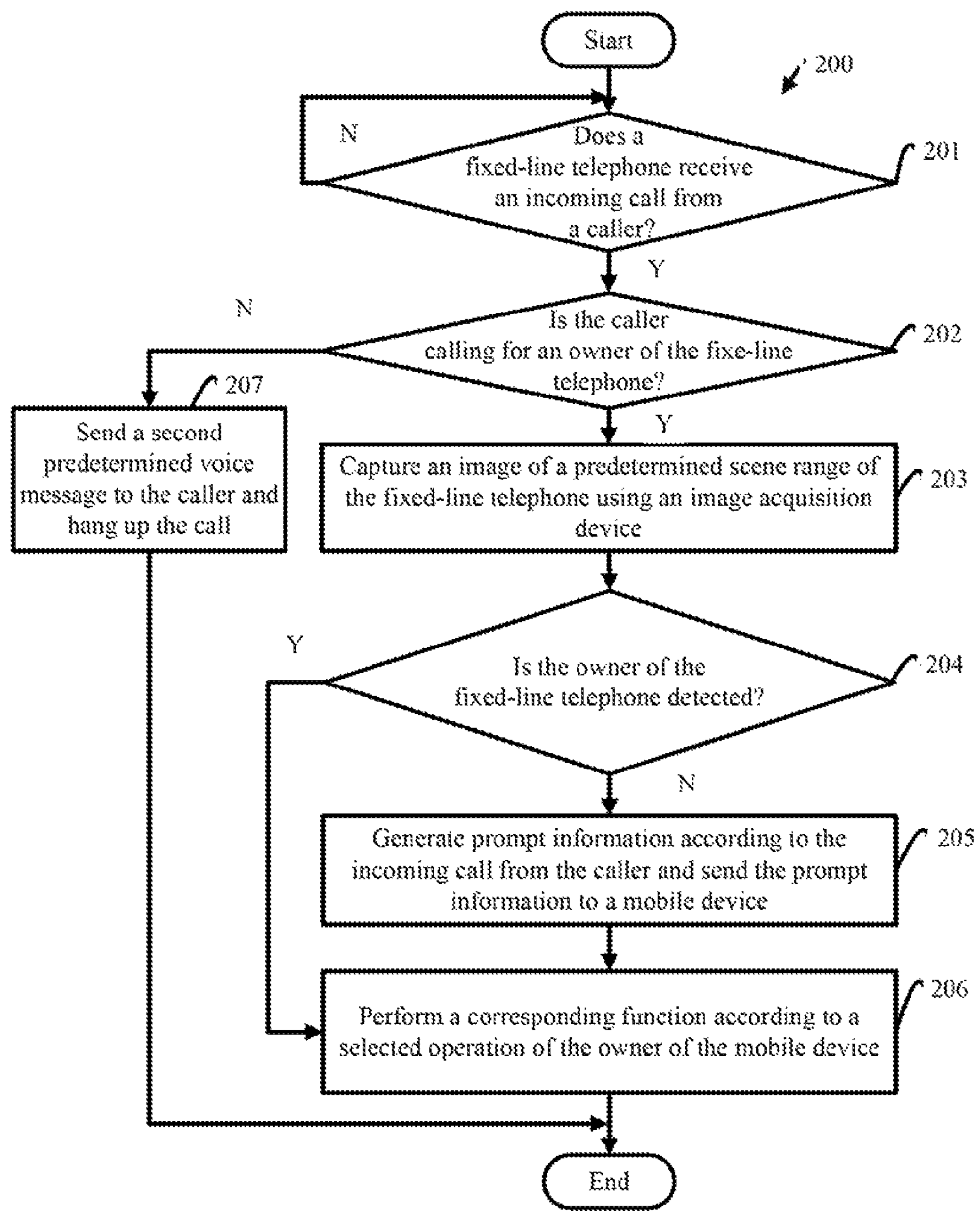
FIG. 2 illustrates a flowchart of one exemplary embodiment of a method for controlling an incoming call using the electronic device of FIG. 1.

FIG. 2 illustrates a flowchart which is presented in accordance with an exemplary embodiment. An exemplary method 200 is provided by way of example, as there are a variety of ways to carry out the method. The exemplary method 200 described below can be carried out using the configurations illustrated in FIG. 1, for example, and various elements of these figures are referenced in explaining exemplary method 200. Each block shown in FIG. 2 represents one or more processes, methods, or subroutines, carried out in the exemplary method 200. Additionally, the illustrated order of blocks is by example only and the order of the blocks can be changed according to the present disclosure. The exemplary method 200 can begin at block 201. Depending on the exemplary embodiment, additional steps can be added, others removed, and the order of the steps can be changed.

At block 201, the detection module 21 can detect whether the fixed-line telephone 2 receives an incoming call from a caller. When the fixed-line telephone 2 receives an incoming call from a caller, the process goes to block 202.

At block 202, the inquiring module 22 can respond to the incoming call and determine whether the incoming call is calling for the owner of the fixed-line telephone 2. When the incoming call is calling for the owner of the fixed-line telephone 2, the process goes to block 203. When the incoming call is not calling for the owner of the fixed-line telephone 2, the process goes to block 207.

In at least one exemplary embodiment, the inquiring module 22 determine whether the incoming call is calling for the owner of the fixed-line telephone 2 by at least following steps. The inquiring module 22 outputs a first predetermined voice message to the caller. In at least one exemplary embodiment, the storage device 12 can prestore a name of the owner of the fixed-line telephone 2. In at least one exemplary embodiment, the first predetermined voice message may be for example "please let me know who are you, and who do you want to call". The inquiring module 22 determines whether the caller is calling for the owner of the fixed-line telephone 2 according to an answer from the caller. For example, the inquiring module 22 outputs the first predetermined voice message to the caller, and receives the answer from the caller. The inquiring module 22 compares the answer to the stored name of the owner of the fixed-line telephone 2 to recognize whether the incoming call calls for the owner of the fixed-line telephone 2. When the name of the owner of the fixed-line telephone 2 is recognized from the answer of the caller, the inquiring module 22 determines that the caller is calling for the owner of the fixed-line telephone 2. When the name of the owner of the fixed-line telephone 2 is not recognized from the answer of the caller, the inquiring module 22 determines that the caller is not calling for the owner of the fixed-line telephone 2. In at least one exemplary embodiment, the inquiring module 22 can further recognize a name of the caller from the answer of the caller.

At block 207, when the inquiring module 22 determines that the caller is not calling for the owner of the fixed-line telephone 2, the inquiring module 22 further can output a second predetermined voice message to the caller and hang up the incoming call. The second predetermined voice message may be for example "Sorry, you have the wrong number.".

At block 203, the acquiring module 23 can activate the image acquisition device 11 to capture an image of a predetermined scene range of the fixed-line telephone 2. The acquiring module 23 further can send the captured image to the recognizing module 24. In at least one exemplary embodiment, the predetermined scene range of the fixed-line telephone 2 can be a semicircle whose center is the position where the owner of the fixed-line telephone 2 sits. The semicircle has a predetermined radius value such as 1 meter, 1.5 meters. In at least one exemplary embodiment, the fixed-line telephone 2 may be positioned near the position where the owner of the fixed-line telephone 2 sits.

At block 204, the recognizing module 24 can determine whether the owner of the fixed-line telephone 2 is detected by analyzing the captured image. When the owner of the fixed-line telephone 2 is detected, the process goes to block 206. When the owner of the fixed-line telephone 2 is not detected, the process goes to block 205.

In at least one exemplary embodiment, when the captured image does not include a facial image, the recognizing module 24 determines that the captured image does not include the owner of the fixed-line telephone 2, and determines that the owner of the fixed-line telephone 2 is not detected.

In at least one exemplary embodiment, when the captured image includes a facial image, the recognizing module 24 can preprocess the captured image such as making light compensation for the captured image, making grey level transformation for the captured image, making geometric correction for the captured image, filtering the captured image, and sharpening the captured image. The recognizing module 24 can extract geometry characteristics of the facial image. In at least one exemplary embodiment, the geometry characteristics can be characteristics constituted by eyes, a nose, and a mouth of the facial image. The recognizing module 24 further can compare the extracted geometry characteristics with predetermined geometry characteristics that are prestored in the storage device 12. When the extracted geometry characteristics match the predetermined geometry characteristics, the recognizing module 24 can determine the owner of the fixed-line telephone 2 is detected. When the extracted geometry characteristics do not match the predetermined geometry characteristics, the recognizing module 24 can determine that the owner of the fixed-line telephone 2 is not detected.

At block 205, when the owner of the fixed-line telephone 2 is not detected, the sending module 25 can generate prompt information according to the incoming call from the caller, and send the prompt information to the mobile device 3.

In at least one exemplary embodiment, the sending module 25 can send the prompt information through a network. The network may be wireless networks, such as Global System for Mobile Communications (GSM), General Packet Radio Service (GPRS), Code Division Multiple Access (CDMA), Wideband CDMA (W-CDMA), Wireless Fidelity (Wi-Fi), Long-Term Evolution (LTE), LTE Advanced and so on. In at least one exemplary embodiment, the prompt information includes a name of the caller.

In at least one exemplary embodiment, the sending module 25 can send the prompt information to the mobile device 3 in a form of a text message. The mobile device 3 can display the text message on a display device thereof. The mobile device 3 can provide a first virtual button for answering the incoming call and a second virtual button for refusing the incoming call.

In other exemplary embodiments, the sending module 25 can send the prompt information to the mobile device 3 in a form of voice data, and the owner of the mobile device 3 can answer or refuse the incoming call through voices.

At block 206, the controlling module 26 can perform a corresponding function according to a selected operation that has been made by the owner of the mobile device 3.

For example, when the owner of the mobile device 3 selects the first virtual button, the mobile device 3 can send at least one answer signal to the electronic device 1. The controlling module 26 can respond to the answer signal by transferring the incoming call from the fixed-line telephone 2 to the mobile device 3. When the owner of the mobile device 3 selects the second virtual button, the mobile device 3 can send at least one reject signal to the electronic device 1. The controlling module 26 can respond to the reject signal by hanging up the incoming call, and send a third predetermined voice message to the caller. The third predetermined voice message may be "Sorry, YY is busy now. He/she is not available to answer your call". YY is the name of the owner of the fixed-line telephone 2.

It should be emphasized that the above-described exemplary embodiments of the present disclosure, including any particular exemplary embodiments, are merely possible examples of implementations, set forth for a clear understanding of the principles of the disclosure. Many variations and modifications can be made to the above-described exemplary embodiment(s) of the disclosure without departing substantially from the spirit and principles of the disclosure. All such modifications and variations are intended to be included herein within the scope of this disclosure and protected by the following claims.

What is claimed is:

1. A controlling method applied in an electronic device, the electronic device comprising an image acquisition device and a storage device, the electronic device establishing communication connections with a fixed-line telephone and at least one mobile device, the method comprising:

sending a first predetermined voice message to a caller when the fixed-line telephone receives an incoming call from the caller;

determining whether the incoming call is calling for an owner of the fixed-line telephone;

capturing an image of a predetermined scene range of the fixed-line telephone using the image acquisition device, when the incoming call is determined to be calling for the owner of the fixed-line telephone;

determining whether the owner of the fixed-line telephone is detected by analyzing the captured image;

sending prompt information to the at least one mobile device when the owner of the fixed-line telephone is not detected; and performing a corresponding function according to a selected operation of an owner of the at least one mobile device.

2. The method according to claim 1, further comprising:

sending a second predetermined voice message to the caller and disconnecting the incoming call when the caller is not calling for the owner of the fixed-line telephone.

3. The method according to claim 1, wherein whether the caller is calling for the owner of the fixed-line telephone is determined by determining whether an answer from the caller comprises a name of the owner of the fixed-line telephone.

4. The method according to claim 1, wherein the prompt information is sent to the at least one mobile device in a form of a text message or in a form of voice data.

5. The method according to claim 1, wherein the selected operation of the owner of the at least one mobile device comprises:

answering the incoming call by selecting a first virtual button displayed on a display device of the at least one mobile device; and rejecting the incoming call by selecting a second virtual button displayed on the display device.

6. The method according to claim 5, wherein the corresponding function comprises:

transferring the incoming call from the fixed-line telephone to the at least one mobile device when the first virtual button is selected and the at least one mobile device sends at least one answer signal to the electronic device; and disconnecting the incoming call and sending a third predetermined voice message to the caller when the second virtual button is selected and the at least one mobile device sends at least one reject signal to the electronic device.

7. An electronic device being connected with a fixed-line telephone and at least one mobile device, the electronic device comprising:

an image acquisition device;

at least one processor; and a storage device configured to store one or more programs that, when executed by the at least one processor, cause the at least one processor to:

send a first predetermined voice message to a caller when the fixed-line telephone receives an incoming call from the caller;

determine whether the incoming call is calling for an owner of the fixed-line telephone;

capture an image of a predetermined scene range of the fixed-line telephone using the image acquisition device, when the incoming call is determined to be calling for the owner of the fixed-line telephone;

determine whether the owner of the fixed-line telephone is detected by analyzing the captured image;

send prompt information to the at least one mobile device when the owner of the fixed-line telephone is not detected; and perform a corresponding function according to a selected operation of an owner of the at least one mobile device.

8. The electronic device according to claim 7, wherein the at least one processor is further caused to:

send a second predetermined voice message to the caller and disconnect the incoming call when the caller is not calling for the owner of the fixed-line telephone.

9. The electronic device according to claim 7, wherein whether the caller is calling for the owner of the fixed-line telephone is determined by determining whether an answer from the caller comprises a name of the owner of the fixed-line telephone.

10. The electronic device according to claim 7, wherein the prompt information is sent to the at least one mobile device in a form of a text message or in a form of voice data.

11. The electronic device according to claim 7, wherein the selected operation of the owner of the at least one mobile device comprises:

answering the incoming call by selecting a first virtual button displayed on a display device of the at least one mobile device; and rejecting the incoming call by selecting a second virtual button displayed on the display device.

12. The electronic device according to claim 11, wherein the corresponding function comprises:

transferring the incoming call from the fixed-line telephone to the at least one mobile device when the first virtual button is selected and the at least one mobile device sends at least one answer signal to the electronic device; and disconnecting the incoming call and sending a third predetermined voice message to the caller when the second virtual button is selected and the at least one mobile device sends at least one reject signal to the electronic device.

13. A non-transitory storage medium having instructions stored thereon, when executed by a processor of an electronic device, cause the processor to perform a method for controlling an incoming call, the electronic device comprising an image acquisition device and a storage device, the electronic device being connected with a fixed-line telephone and at least one mobile device, wherein the method comprises:

sending a first predetermined voice message to a caller when the fixed-line telephone receives an incoming call from the caller;

determining whether the incoming call is calling for an owner of the fixed-line telephone;

capturing an image of a predetermined scene range of the fixed-line telephone using the image acquisition device, when the incoming call is determined to be calling for the owner of the fixed-line telephone;

determining whether the owner of the fixed-line telephone is detected by analyzing the captured image;

sending prompt information to the at least one mobile device when the owner of the fixed-line telephone is not detected; and performing a corresponding function according to a selected operation of an owner of the at least one mobile device.

14. The non-transitory storage medium according to claim 13, wherein the method further comprises:

sending a second predetermined voice message to the caller and disconnecting the incoming call when the caller is not calling for the owner of the fixed-line telephone.

15. The non-transitory storage medium according to claim 13, wherein whether the caller is calling for the owner of the fixed-line telephone is determined by determining whether an answer from the caller comprises a name of the owner of the fixed-line telephone.

16. The non-transitory storage medium according to claim 13, wherein the prompt information is sent to the at least one mobile device in a form of a text message or in a form of voice data.

17. The non-transitory storage medium according to claim 13, wherein the selected operation of the owner of the at least one mobile device comprises:

answering the incoming call by selecting a first virtual button displayed on a display device of the at least one mobile device; and rejecting the incoming call by selecting a second virtual button displayed on the display device.

18. The non-transitory storage medium according to claim 17, wherein the corresponding function comprises:

transferring the incoming call from the fixed-line telephone to the at least one mobile device when the first virtual button is selected and the at least one mobile device sends at least one answer signal to the electronic device; and disconnecting the incoming call and sending a third predetermined voice message to the caller when the second virtual button is selected and the at least one mobile device sends at least one reject signal to the electronic device.

* * * * *